(12) United States Patent
Shpunt et al.

(10) Patent No.: US 9,098,931 B2
(45) Date of Patent: Aug. 4, 2015

(54) SCANNING PROJECTORS AND IMAGE CAPTURE MODULES FOR 3D MAPPING

(75) Inventors: Alexander Shpunt, Tel Aviv (IL); Benny Pesach, Rosh HaAyin (IL); Ronen Akerman, Modiin (IL)

(73) Assignee: APPLE INC., Cupertino, CA (US)

( * ) Notice: Subject to any disclaimer, the term of this patent is extended or adjusted under 35 U.S.C. 154(b) by 318 days.

(21) Appl. No.: 13/810,451

(22) PCT Filed: Aug. 10, 2011

(86) PCT No.: PCT/IB2011/053560
§ 371 (c)(1),
(2), (4) Date: Jan. 16, 2013

(87) PCT Pub. No.: WO2012/020380
PCT Pub. Date: Feb. 16, 2012

(65) Prior Publication Data
US 2013/0127854 A1    May 23, 2013

Related U.S. Application Data

(60) Provisional application No. 61/372,729, filed on Aug. 11, 2010, provisional application No. 61/425,788, filed on Dec. 22, 2010.

(51) Int. Cl.
*G06T 17/00* (2006.01)
*G01B 11/25* (2006.01)

(52) U.S. Cl.
CPC ............ *G06T 17/00* (2013.01); *G01B 11/2518* (2013.01)

(58) Field of Classification Search
None
See application file for complete search history.

(56) References Cited

U.S. PATENT DOCUMENTS

| | | |
|---|---|---|
| 3,796,498 A | 3/1974 | Post |
| 4,336,978 A | 6/1982 | Suzuki |
| 4,542,376 A | 9/1985 | Bass et al. |
| 4,802,759 A | 2/1989 | Matsumoto |
| 4,843,568 A | 6/1989 | Krueger et al. |
| 4,850,673 A | 7/1989 | Velzel et al. |
| 5,075,562 A | 12/1991 | Greivenkamp et al. |
| 5,406,543 A | 4/1995 | Kobayashi et al. |
| 5,477,383 A | 12/1995 | Jain |

(Continued)

FOREIGN PATENT DOCUMENTS

| | | |
|---|---|---|
| CN | 1725042 A | 1/2006 |
| DE | 19736169 A1 | 8/1997 |

(Continued)

OTHER PUBLICATIONS

U.S. Appl. No. 12/844,864 Office Action dated Sep. 26, 2013.

(Continued)

*Primary Examiner* — Maurice L McDowell, Jr.
(74) *Attorney, Agent, or Firm* — D. Kligler I.P. Services Ltd.

(57) ABSTRACT

Apparatus (20) for mapping includes an illumination module (30), which includes a radiation source (32), which is configured to emit a beam of radiation. A scanner (34) receives and scans the beam over a selected angular range. Illumination optics (35) project the scanned beam so as to create a pattern of spots extending over a region of interest. An imaging module (38) captures an image of the pattern that is projected onto an object (28) in the region of interest. A processor (46) processes the age in order to construct a three-dimensional (3D) map of the object.

56 Claims, 7 Drawing Sheets

(56) References Cited

U.S. PATENT DOCUMENTS

| | | |
|---|---|---|
| 5,483,261 A | 1/1996 | Yasutake |
| 5,606,181 A | 2/1997 | Sakuma et al. |
| 5,630,043 A | 5/1997 | Uhlin |
| 5,636,025 A | 6/1997 | Bieman et al. |
| 5,648,951 A | 7/1997 | Kato |
| 5,691,989 A | 11/1997 | Rakuljic et al. |
| 5,712,682 A | 1/1998 | Hannah |
| 5,742,262 A | 4/1998 | Tabata et al. |
| 5,781,332 A | 7/1998 | Ogata |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |
| 6,002,520 A | 12/1999 | Hoch et al. |
| 6,031,611 A | 2/2000 | Rosakis et al. |
| 6,041,140 A | 3/2000 | Binns et al. |
| 6,081,269 A | 6/2000 | Quarendon |
| 6,084,712 A | 7/2000 | Harding |
| 6,088,105 A | 7/2000 | Link |
| 6,099,134 A | 8/2000 | Taniguchi et al. |
| 6,100,517 A | 8/2000 | Yahav et al. |
| 6,101,269 A | 8/2000 | Hunter et al. |
| 6,108,036 A | 8/2000 | Harada et al. |
| 6,167,151 A | 12/2000 | Albeck |
| 6,259,561 B1 | 7/2001 | George et al. |
| 6,262,740 B1 | 7/2001 | Lauer et al. |
| 6,268,923 B1 | 7/2001 | Michniewicz et al. |
| 6,301,059 B1 | 10/2001 | Huang et al. |
| 6,377,700 B1 | 4/2002 | Mack et al. |
| 6,438,263 B2 | 8/2002 | Albeck et al. |
| 6,494,837 B2 | 12/2002 | Kim et al. |
| 6,495,848 B1 | 12/2002 | Rubbert |
| 6,560,019 B2 | 5/2003 | Nakai |
| 6,583,873 B1 | 6/2003 | Goncharov et al. |
| 6,611,000 B2 | 8/2003 | Tamura et al. |
| 6,686,921 B1 | 2/2004 | Rushmeier et al. |
| 6,700,669 B1 | 3/2004 | Geng |
| 6,707,027 B2 | 3/2004 | Liess et al. |
| 6,731,391 B1 | 5/2004 | Kao et al. |
| 6,741,251 B2 | 5/2004 | Malzbender |
| 6,750,906 B1 | 6/2004 | Itani et al. |
| 6,751,344 B1 | 6/2004 | Grumbine |
| 6,754,370 B1 | 6/2004 | Hall-Holt et al. |
| 6,759,646 B1 | 7/2004 | Acharya et al. |
| 6,803,777 B2 | 10/2004 | Pfaff et al. |
| 6,810,135 B1 | 10/2004 | Berenz et al. |
| 6,813,440 B1 | 11/2004 | Yu et al. |
| 6,825,985 B2 | 11/2004 | Brown et al. |
| 6,841,780 B2 | 1/2005 | Cofer et al. |
| 6,859,326 B2 | 2/2005 | Sales |
| 6,927,852 B2 | 8/2005 | Reel |
| 6,937,348 B2 | 8/2005 | Geng |
| 6,940,583 B2 | 9/2005 | Butt et al. |
| 7,006,952 B1 | 2/2006 | Matsumoto et al. |
| 7,009,742 B2 | 3/2006 | Brotherton-Ratcliffe et al. |
| 7,013,040 B2 | 3/2006 | Shiratani |
| 7,076,024 B2 | 7/2006 | Yokhin |
| 7,112,774 B2 | 9/2006 | Baer |
| 7,120,228 B2 | 10/2006 | Yokhin et al. |
| 7,127,101 B2 | 10/2006 | Littlefield et al. |
| 7,194,105 B2 | 3/2007 | Hersch et al. |
| 7,227,618 B1 | 6/2007 | Bi |
| 7,231,069 B2 | 6/2007 | Nahata |
| 7,256,899 B1 | 8/2007 | Faul et al. |
| 7,304,735 B2 | 12/2007 | Wang et al. |
| 7,335,898 B2 | 2/2008 | Donders et al. |
| 7,369,685 B2 | 5/2008 | DeLean |
| 7,385,708 B2 | 6/2008 | Ackerman et al. |
| 7,433,024 B2 | 10/2008 | Garcia et al. |
| 7,551,719 B2 | 6/2009 | Yokhin et al. |
| 7,560,679 B1 | 7/2009 | Gutierrez |
| 7,659,995 B2 | 2/2010 | Knighton et al. |
| 7,700,904 B2 | 4/2010 | Toyoda et al. |
| 7,751,063 B2 | 7/2010 | Dillon et al. |
| 7,811,825 B2 | 10/2010 | Fauver et al. |
| 7,840,031 B2 | 11/2010 | Albertson et al. |
| 7,952,781 B2 | 5/2011 | Weiss et al. |
| 8,018,579 B1 | 9/2011 | Krah |
| 8,035,806 B2 | 10/2011 | Jin et al. |
| 8,126,261 B2 | 2/2012 | Medioni et al. |
| 8,326,025 B2 | 12/2012 | Boughorbel |
| 8,384,997 B2 | 2/2013 | Shpunt et al. |
| 2001/0016063 A1 | 8/2001 | Albeck et al. |
| 2002/0041327 A1 | 4/2002 | Hildreth et al. |
| 2002/0075456 A1 | 6/2002 | Shiratani |
| 2003/0048237 A1 | 3/2003 | Sato et al. |
| 2003/0057972 A1 | 3/2003 | Pfaff et al. |
| 2003/0156756 A1 | 8/2003 | Gokturk et al. |
| 2004/0001145 A1 | 1/2004 | Abbate |
| 2004/0012958 A1 | 1/2004 | Hashimoto et al. |
| 2004/0063235 A1 | 4/2004 | Chang |
| 2004/0082112 A1 | 4/2004 | Stephens |
| 2004/0105580 A1 | 6/2004 | Hager et al. |
| 2004/0130730 A1 | 7/2004 | Cantin et al. |
| 2004/0130790 A1 | 7/2004 | Sales |
| 2004/0174770 A1 | 9/2004 | Rees |
| 2004/0213463 A1 | 10/2004 | Morrison |
| 2004/0218262 A1 | 11/2004 | Chuang et al. |
| 2004/0228519 A1 | 11/2004 | Littlefield et al. |
| 2004/0264764 A1 | 12/2004 | Kochi et al. |
| 2005/0018209 A1 | 1/2005 | Lemelin et al. |
| 2005/0052637 A1 | 3/2005 | Shaw et al. |
| 2005/0111705 A1 | 5/2005 | Waupotitsch et al. |
| 2005/0134582 A1 | 6/2005 | Claus et al. |
| 2005/0135555 A1 | 6/2005 | Claus et al. |
| 2005/0178950 A1 | 8/2005 | Yoshida |
| 2005/0200838 A1 | 9/2005 | Shaw et al. |
| 2005/0200925 A1 | 9/2005 | Brotherton-Ratcliffe et al. |
| 2005/0231465 A1 | 10/2005 | DePue et al. |
| 2005/0271279 A1 | 12/2005 | Fujimura et al. |
| 2006/0001055 A1 | 1/2006 | Ueno et al. |
| 2006/0017656 A1 | 1/2006 | Miyahara |
| 2006/0072851 A1 | 4/2006 | Kang et al. |
| 2006/0156756 A1 | 7/2006 | Becke |
| 2006/0221218 A1 | 10/2006 | Adler et al. |
| 2006/0221250 A1 | 10/2006 | Rossbach et al. |
| 2006/0252167 A1 | 11/2006 | Wang |
| 2006/0252169 A1 | 11/2006 | Ashida |
| 2006/0269896 A1 | 11/2006 | Liu et al. |
| 2007/0019909 A1 | 1/2007 | Yamauchi et al. |
| 2007/0057946 A1 | 3/2007 | Albeck et al. |
| 2007/0060336 A1 | 3/2007 | Marks et al. |
| 2007/0133840 A1 | 6/2007 | Cilia |
| 2007/0165243 A1 | 7/2007 | Kang et al. |
| 2007/0262985 A1 | 11/2007 | Watanabe et al. |
| 2008/0018595 A1 | 1/2008 | Hildreth et al. |
| 2008/0031513 A1 | 2/2008 | Hart |
| 2008/0037829 A1 | 2/2008 | Givon |
| 2008/0106746 A1 | 5/2008 | Shpunt et al. |
| 2008/0118143 A1 | 5/2008 | Gordon et al. |
| 2008/0198355 A1 | 8/2008 | Domenicali et al. |
| 2008/0212835 A1 | 9/2008 | Tavor |
| 2008/0240502 A1 | 10/2008 | Freedman et al. |
| 2008/0247670 A1 | 10/2008 | Tam et al. |
| 2008/0278572 A1 | 11/2008 | Gharib et al. |
| 2008/0285827 A1 | 11/2008 | Meyer et al. |
| 2009/0016642 A1 | 1/2009 | Hart |
| 2009/0046152 A1 | 2/2009 | Aman |
| 2009/0060307 A1 | 3/2009 | Ghanem et al. |
| 2009/0090937 A1 | 4/2009 | Park |
| 2009/0096783 A1 | 4/2009 | Shpunt et al. |
| 2009/0183125 A1 | 7/2009 | Magal et al. |
| 2009/0183152 A1 | 7/2009 | Yang et al. |
| 2009/0185274 A1 | 7/2009 | Shpunt |
| 2009/0226079 A1 | 9/2009 | Katz et al. |
| 2009/0244309 A1 | 10/2009 | Maison et al. |
| 2010/0007717 A1 | 1/2010 | Spektor et al. |
| 2010/0013860 A1 | 1/2010 | Mandella et al. |
| 2010/0020078 A1 | 1/2010 | Shpunt |
| 2010/0118123 A1 | 5/2010 | Freedman et al. |
| 2010/0128221 A1 | 5/2010 | Muller et al. |
| 2010/0142014 A1 | 6/2010 | Rosen et al. |
| 2010/0177164 A1 | 7/2010 | Zalevsky et al. |
| 2010/0182406 A1 | 7/2010 | Benitez |

(56) References Cited

U.S. PATENT DOCUMENTS

| | | | |
|---|---|---|---|
| 2010/0194745 | A1 | 8/2010 | Leister et al. |
| 2010/0201811 | A1 | 8/2010 | Garcia et al. |
| 2010/0225746 | A1 | 9/2010 | Shpunt et al. |
| 2010/0243899 | A1 | 9/2010 | Ovsiannikov et al. |
| 2010/0245826 | A1 | 9/2010 | Lee |
| 2010/0265316 | A1 | 10/2010 | Sali et al. |
| 2010/0278384 | A1 | 11/2010 | Shotton et al. |
| 2010/0284082 | A1 | 11/2010 | Shpunt et al. |
| 2010/0290698 | A1 | 11/2010 | Shpunt et al. |
| 2010/0303289 | A1 | 12/2010 | Polzin et al. |
| 2011/0001799 | A1 | 1/2011 | Rothenberger et al. |
| 2011/0019258 | A1 | 1/2011 | Levola |
| 2011/0025827 | A1 | 2/2011 | Shpunt et al. |
| 2011/0043403 | A1 | 2/2011 | Loffler |
| 2011/0069389 | A1 | 3/2011 | Shpunt |
| 2011/0074932 | A1 | 3/2011 | Gharib et al. |
| 2011/0075259 | A1 | 3/2011 | Shpunt |
| 2011/0096182 | A1 | 4/2011 | Cohen et al. |
| 2011/0114857 | A1 | 5/2011 | Akerman et al. |
| 2011/0134114 | A1 | 6/2011 | Rais et al. |
| 2011/0158508 | A1 | 6/2011 | Shpunt et al. |
| 2011/0187878 | A1 | 8/2011 | Mor et al. |
| 2011/0188054 | A1 | 8/2011 | Petronius et al. |
| 2011/0211044 | A1 | 9/2011 | Shpunt et al. |
| 2011/0279648 | A1 | 11/2011 | Lutian et al. |
| 2011/0285910 | A1 | 11/2011 | Bamji et al. |
| 2011/0295331 | A1 | 12/2011 | Wells et al. |
| 2011/0310125 | A1 | 12/2011 | McEldowney et al. |
| 2012/0012899 | A1 | 1/2012 | Jin et al. |
| 2012/0038986 | A1 | 2/2012 | Pesach |
| 2012/0051588 | A1 | 3/2012 | McEldowney |
| 2012/0140094 | A1 | 6/2012 | Shpunt et al. |
| 2012/0140109 | A1 | 6/2012 | Shpunt et al. |
| 2012/0249744 | A1 | 10/2012 | Pesach et al. |
| 2012/0281240 | A1 | 11/2012 | Cohen et al. |
| 2013/0038881 | A1 | 2/2013 | Pesach et al. |
| 2013/0038941 | A1 | 2/2013 | Pesach et al. |
| 2013/0127854 | A1 | 5/2013 | Shpunt et al. |
| 2013/0206967 | A1 | 8/2013 | Shpunt et al. |
| 2013/0207970 | A1 | 8/2013 | Shpunt et al. |

FOREIGN PATENT DOCUMENTS

| | | |
|---|---|---|
| DE | 19638727 A1 | 3/1998 |
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2000131040 A | 5/2000 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| JP | 2011118178 A | 6/2011 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2012066501 A1 | 5/2012 |

OTHER PUBLICATIONS

U.S. Appl. No. 13/921,224 Office Action dated Oct. 3, 2013.
U.S. Appl. No. 12/958,427 Office Action dated Nov. 22, 2013.
U.S. Appl. No. 13/567,095 Office Action dated Oct. 1, 2013.
U.S. Appl. No. 13/008,042 Office Action dated Dec. 3, 2013.
Fienup, J.R., "Phase Retrieval Algorithms: A Comparison", Applied Optics, vol. 21, No. 15, Aug. 1, 1982.
International Application PCT/IL2008/01592 Search Report dated Apr. 3, 2009.
U.S. Appl. No. 12/840,312 Office Action dated Jul. 12, 2012.
Gerchberg et al., "A Practical Algorithm for the Determination of the Phase from Image and Diffraction Plane Pictures," Journal Optik, vol. 35, No. 2, pp. 237-246, year 1972.
Sazbon et al., "Qualitative Real-Time Range Extraction for Preplanned Scene Partitioning Using Laser Beam Coding," Pattern Recognition Letters 26 , pp. 1772-1781, year 2005.
Moharam et al. "Rigorous coupled-wave analysis of planar-grating diffraction", Journal of the Optical Society of America, vol. 71, No. 6, pp. 818-818, Jul. 1981.
U.S. Appl. No. 12/945,908 Official Action dated Dec. 5, 2012.
Eisen et al., "Total internal reflection diffraction grating in conical mounting" ,Optical Communications 261, pp. 13-18, year 2006.
O'Shea et al., "Diffractive Optics: Design, Fabrication and Test", SPIE Tutorial Texts in Optical Engineering, vol. TT62, pp. 66-72, SPIE Press, USA 2004.
U.S. Appl. No. 13/008,042 Official Action dated Jan. 3, 2013.
U.S. Appl. No. 61/568,185, filed Dec. 8, 2011.
U.S. Appl. No. 12/330,766 Official Action dated Dec. 14, 2010.
Ezconn Czech A.S. "Site Presentation", Oct. 2009.
Luxtera Inc., "Luxtera Announces World's First 10GBit CMOS Photonics Platform", Carlsbad, USA, Mar. 28, 2005 (press release).
Bradley et al., "Synchronization and Rolling Shutter Compensation for Consumer Video Camera Arrays", IEEE International Workshop on Projector-Camera Systems—PROCAMS 2009, Miami Beach, Florida, 2009.
Marcia et al., "Fast Disambiguation of Superimposed Images for Increased Field of View", IEEE International Conference on Image Processing, San Diego, USA, Oct. 12-15, 2008.
U.S. Appl. No. 13/798,231, filed Mar. 13, 2013.
Btendo, "Two Uni-axial Scanning Mirrors Vs One Bi-axial Scanning Mirror", Kfar Saba, Israel, Aug. 13, 2008.
Microvision Inc., "Micro-Electro-Mechanical System (MEMS) Scanning Mirror", years 1996-2009.
European Patent Application # 11150668.9 Partial European Search Report dated Apr. 1, 2011.
U.S. Appl. No. 12/330,766 Official Action dated Jun. 7, 2011.
Garcia et al., "Three-dimensional mapping and range measurement by means of projected speckle patterns", Applied Optics, vol. 47, No. 16, pp. 3032-3040, Jun. 1, 2008.
Garcia et al.., "Projection of Speckle Patterns for 3D Sensing", Journal of Physics, Conference series 139, year 2008.
CN Patent Application # 200880199911.9 Office Action dated Jan. 29, 2012.
U.S. Appl. No. 12/955,939 Office Action dated Jan. 30, 2012.
U.S. Appl. No. 12/955,940 Office Action dated Jan. 11, 2012.
U.S. Appl. No. 12/762,373 Office Action dated Mar. 7, 2012.
International Application PCT/IB2011/053560 Search Report dated Jan. 19, 2012.
U.S. Appl. No. 61/611,075, filed Mar. 15, 2012.
International Application PCT/IB2011/055155 Search Report dated Apr. 20, 2012.
U.S. Appl. No. 12/955,939 Office Action dated Jun. 1, 2012.
U.S. Appl. No. 12/955,940 Office Action dated Jun. 27, 2012.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.

(56) References Cited

OTHER PUBLICATIONS

Hart, D., U.S. Appl. No. 09/616,606 "Method and System for High Resolution, Ultra Fast 3-D Imaging", filed Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, Apr. 10, 2003.
Ypsilos et al., "Speech-driven Face Synthesis from 3D Video", 2nd International Symposium on 3D Processing, Visualization and Transmission, Thessaloniki, Greece, Sep. 6-9, 2004.
Hanson et al., "Optics and Fluid Dynamics Department", Annual Progress Report for 1997 (an abstract), year 1997.
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.
Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multidimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56, year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.

Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
EZconn Czech A.S., "Site Presentation", Oct. 2009.
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore Pisa, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.
Hongjun et al., "Shape Measurement by Digital Speckle Temporal Sequence Correlation Method", Acta Optica Sinica Journal, vol. 21, No. 10, pp. 1208-1213, Oct. 2001 (with English abstract).
Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (English translation).
Chinese Patent Application # 200680038004.2 Official Action dated Mar. 30, 2010 (English translation).
Chinese Patent Application # 680038004.2 Official Action dated Aug. 3, 2011 (English translation).
Engfield, N., "Use of Pseudorandom Encoded Grid in U.S. Appl. No. 11/899,542", Andrews Robichaud, Jun. 22, 2011.
Japanese Patent Application # 2008558981 Official Action dated Nov. 2, 2011.
U.S. Appl. No. 12/522,171 Official Action dated Dec. 22, 2011.
U.S. Appl. No. 12/522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 12/330,766 Office Action dated Jul. 16, 2013.
International Application PCT/IB2013/051986 Search Report dated Jul. 30, 2013.
U.S. Appl. No. 13/008,042 Office Action dated Jul. 15, 2013.

(56) References Cited

OTHER PUBLICATIONS

Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.
Chinese Patent Application # 200780016625.5 Official Action dated Oct. 26, 2010.
International Application PCT/IL2009/000285 Search Report dated Jun. 11, 2009.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
International Application PCT/IL2008/000095 Search Report dated Jul. 24, 2008.
Chen et al., "Overview of Three-Dimensional Shape Measurement Using Optical Methods", Society of Photo-Optical Instrumentation Engineers Journal 39(1), pp. 10-22, Jan. 2000.
Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Zhang et al., "Shape from intensity gradient", IEEE Transactions on Systems, Man and Cybernetics—Part A: Systems and Humans, vol. 29, No. 3, pp. 318-325, May 1999.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Takeda et al., "Fourier Transform Methods of Fringe-Pattern Analysis for Computer-Based Topography and Interferometry", Journal of Optical Society of America, vol. 72, No. 1, Jan. 1982.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Lim et al., "Additive Type Moire with Computer Image Processing", Applied Optics Journal, vol. 28, No. 13, pp. 2677-2680, Jul. 1, 1989.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Chinese Patent Application # 200780006560.6 Official Action dated Feb. 1, 2011.
Yao Kun et al., "Measurement of Space Distribution of Laser Gaussian Beam by Speckles Displacement Method" High Power Laser and Particle Beams, vol. 12, No. 2, pp. 141-144, Apr. 30, 2000.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Chinese Patent Application # 200680038004.2 Official Action dated Dec. 24, 2010.
U.S. Appl. No. 12/522,171 Official Action dated Apr. 5, 2012.
U.S. Appl. No. 12/397,362 Official Action dated Apr. 24, 2012.
U.S. Appl. No. 13/036,023 Official Action dated Jan. 7, 2013.
U.S. Appl. No. 12/522,176 Official Action dated Aug. 2, 2012.
U.S. Appl. No. 12/758,047 Official Action dated Oct. 25, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
U.S. Appl. No. 12/844,864 Official Action dated Dec. 6, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.
JP Patent Application # 2008558984 Office Action dated Jul. 3, 2012.
Japanese Patent Application # 2011-517308 Official Action dated Dec. 5, 2012.

SCANNING PROJECTORS AND IMAGE CAPTURE MODULES FOR 3D MAPPING

CROSS-REFERENCE TO RELATED APPLICATIONS

This application claims the benefit of U.S. Provisional Patent Application 61/372,729, filed Aug. 11, 2010, and U.S. Provisional Patent Application 61/425,788, filed Dec. 22, 2010, both of which are incorporated herein by reference.

FIELD OF THE INVENTION

The present invention relates generally to methods and devices for projection and capture of optical radiation, and particularly to projection and image capture for purposes of 3D mapping.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

SUMMARY

The embodiments of the present invention that are described hereinbelow provide methods and apparatus for efficient projection of patterns, particularly for 3D mapping, as well as for imaging of such projected patterns.

There is therefore provided, in accordance with an embodiment of the present invention, apparatus for mapping, which include an illumination module, including a radiation source, which is configured to emit a beam of radiation, and a scanner, which is configured to receive and scan the beam over a selected angular range. Illumination optics are configured to project the scanned beam so as to create a pattern of spots extending over a region of interest. An imaging module is configured to capture an image of the pattern that is projected onto an object in the region of interest. A processor is configured to process the image in order to construct a three-dimensional (3D) map of the object.

The pattern of the spots may be uncorrelated over a range of depths that is mapped by the apparatus.

In some embodiments, the radiation source is controlled so as to modulate an intensity of the beam while the scanner scans the beam, thereby creating the pattern of the spots on the region of interest. The illumination module may be configured to modify the pattern responsively to the image captured by the imaging module. The illumination module may be configured to control at least one of the radiation source and the scanner so as to modify an angular density of the spots in the array within a selected part of the region of interest. Alternatively or additionally, the illumination module may be configured to control at least one of the radiation source and the scanner so as to modify a brightness of the spots in a selected area with the region of interest.

In an alternative embodiment, the scanner is configured to scan the beam over a first angular range, and the optics include a beamsplitter, which is configured to create multiple, angularly-spaced replicas of the scanned beam, which together extend over a second angular range, which is greater than the first angular range. The scanner and the beamsplitter may be configured to tile the region of interest with the pattern created by the multiple, angularly-spaced replicas of the scanned beam.

In another embodiment, the optics include a patterned element, which is configured, when illuminated by the beam, to create the pattern over a first angular range, and the scanner is configured to direct the beam to strike the patterned element at multiple different angles in succession so as to create multiple, angularly-spaced replicas of the pattern, which together extend over a second angular range, which is greater than the first angular range. The scanner and the patterned element may be configured to tile the region of interest with the multiple, angularly-spaced replicas of the pattern.

In still another embodiment, the scanner is configured to scan the beam over a first angular range, and the optics include a scan-expanding element, which is configured to distribute the scanned beam so as to cover a second angular range, greater than the first angular range, with the spatial pattern. The scan-expanding element may be selected from a group of elements consisting of a convex reflector and a diffractive optical element.

In a disclosed embodiment, the illumination module includes at least one beam sensor, which is positioned at a selected angle within the angular range that is scanned by the scanner so as to receive the scanned beam periodically and verify thereby that the scanner is operating. Typically, the illumination module is configured to inhibit emission of the beam from the radiation source when the sensor fails to receive the scanned beam periodically.

In some embodiments, the radiation source includes a first radiation source, which emits an infrared beam, which is modulated to create the pattern of the spots, and a second radiation source, which emits a visible light beam, which is modulated to project a visible image onto the region of interest. The scanner and optics are configured to project both the infrared beam and the visible light beam onto the region of interest simultaneously. Typically, the second radiation source is controlled so as to project the visible image onto the object responsively to the 3D map.

In disclosed embodiments, the processor is arranged to derive the 3D map by finding respective offsets between the spots in areas of the captured image and corresponding reference spot locations belonging to a reference image of the pattern, wherein the respective offsets are indicative of respective distances between the areas and the image capture assembly. In some embodiments, the imaging module includes a position-sensitive detector, which is configured to sense and output an offset of each spot in the pattern on the object as the spot is projected by the illumination module. The imaging module may be configured to scan a field of view of the position-sensitive detector in synchronization with the scanner in the illumination module or together with the beam from the radiation source.

Alternatively or additionally, the illumination module and the imaging module are arranged so that the offsets occur in a first direction, and the imaging module includes an array of detector elements arranged in one or more rows extending in the first direction, and astigmatic optics, which are configured to image the pattern onto the array and have a greater optical power in the first direction than in a second, perpendicular direction.

In some embodiments, the imaging module includes a sensor and imaging optics, which define a sensing area that is scanned over the region of interest in synchronization with the scanned beam of the illumination module. The sensor may include an image sensor having a rolling shutter, wherein the rolling shutter is synchronized with the scanned beam. Additionally or alternatively, the scanner in the illumination module may be controllable to dynamically vary the selected angular range, and the imaging module may include an imaging scanner, which is configured to dynamically scan the sensing area to match the selected angular range of the scanned beam.

There is also provided, in accordance with an embodiment of the present invention, apparatus for mapping, which includes an illumination module, including a radiation source, which is configured to emit a beam of radiation having an intensity that varies according to a specified temporal modulation. A scanner is configured to receive and scan the beam over a region of interest, so as to project the radiation onto the region with a spatial intensity pattern determined by the temporal modulation of the beam. An imaging module is configured to capture an image of the spatial intensity pattern that is projected onto an object in the region of interest. A processor is configured to process the image in order to construct a three-dimensional (3D) map of the object.

In a disclosed embodiment, the temporal modulation is binary, and wherein the spatial intensity pattern includes an array of spots generated by the temporal modulation.

In one embodiment, the imaging module includes a sensor and imaging optics, which define a sensing area that is scanned over the region of interest in synchronization with the scanned beam of the illumination module.

There is additionally provided, in accordance with an embodiment of the present invention, a method for mapping, which includes scanning a beam of radiation over a selected angular range so as to create a pattern of spots extending over a region of interest. An image of the pattern that is projected onto an object in the region of interest is captured and processed in order to construct a three-dimensional (3D) map of the object.

There is further provided, in accordance with an embodiment of the present invention, a method for mapping, which includes generating a beam of radiation having an intensity that varies according to a specified temporal modulation. The beam is scanned over a region of interest, so as to project the radiation onto the region with a spatial intensity pattern determined by the temporal modulation of the beam. An image of the spatial intensity pattern that is projected onto an object in the region of interest is captured and processed in order to construct a three-dimensional (3D) map of the object.

The present invention will be more fully understood from the following detailed description of the embodiments thereof, taken together with the drawings in which:

DETAILED DESCRIPTION OF EMBODIMENTS

Figure 1:
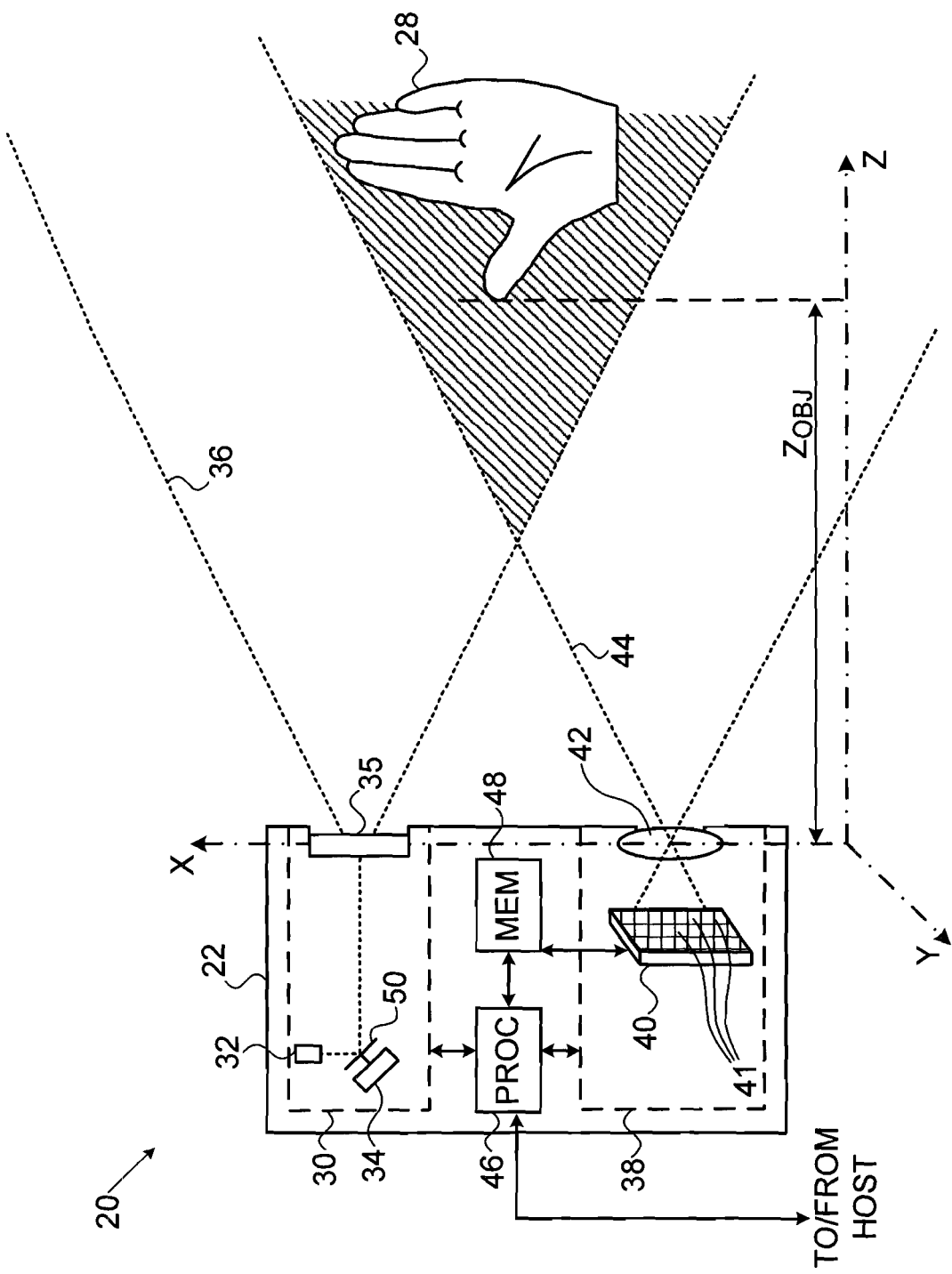
FIG. 1 is a schematic top view of a system for 3D mapping, in accordance with an embodiment of the present invention.

The embodiments of the present invention that are described hereinbelow provide, inter alia, methods and apparatus for efficient projection of patterns, particularly for 3D mapping, as well as for efficient imaging of such projected patterns.

In some embodiments of the present invention, an illumination module projects a pattern of spots onto a region of interest, and an imaging module captures an image of the pattern appearing on objects in the region. This image is processed in order to find the locations of the spots in the image and, on this basis, to construct a 3D map of an object in the region of interest. The depth coordinates in the map are computed by triangulation, typically based on the offsets of the spots in the image relative to corresponding reference spot locations in a reference image of the pattern.

In the disclosed embodiments, the pattern is projected dynamically, i.e., it is not projected all at once over the entire region, but is rather created by scanning a beam emitted by a radiation source. The beam is scanned over a selected angular range. (Some of the disclosed embodiments are directed to controlling and/or expanding this range.) The intensity of the beam is typically modulated during the scan in order to create the desired pattern. The scan is "dynamic" in the sense that aspects of the pattern, such as its density, brightness, and/or angular range, may be modified in the course of mapping a given scene. Although the embodiments described hereinbelow are drawn specifically to spot patterns, the principles of the present invention may similarly be applied in creating patterns of other sorts for purposes of 3D mapping.

This dynamic scanning approach is advantageous in a number of important respects. For example, dynamic scanning in this manner affords flexibility in creation of the pattern, particularly in that the pattern can be modified on the basis of the image of the region of interest. For example, the angular density of the spots in the pattern and/or the brightness of the spots can be varied in different areas, depending on scene conditions and features of objects of interest in the scene.

The imaging module can likewise be operated dynamically in conjunction with the scan of the illuminating beam, so that the active field of view of the imaging module tracks the area of the pattern that is actually illuminated at any point in the scan. The image thus created of the region of interest is not necessarily captured all at once, as in conventional image sensors, but may be assembled electronically based on local signals captured by a detector during the scan, as a part of the process of creating the 3D map. Concentrating the illumination and detection resources in a small, moving area in this way can enhance the signal/background ratio of the detected pattern and hence improve the accuracy of 3D mapping. The field of view of the imaging module can track the scan of the illuminating beam optically, possibly using (at least in part) the same scanner as the illumination module, or electronically, using an image sensor with a rolling shutter, for example.

Some of the embodiments described below are directed to expanding the angular range of the scan provided by the illumination module. These embodiments address the need of some 3D mapping systems for a wide field of view, which is much larger than the scan range of some conventional scanners. In one such embodiment, the optics of the projection module comprise a beamsplitter, which simultaneously creates multiple, angularly-spaced replicas of the scanned beam. These replicas together extend over a larger angular range than the scan range. In another embodiment, the scanner directs the beam from the radiation source to strike a patterned element at multiple different angles in succession, and thus to create multiple, angularly-spaced replicas of the pattern. In either case, the elements of the illumination module may be configured to tile the region of interest with the pattern in this manner, i.e., to cover the region with adjacent replicas of the pattern, without significant overlap or gaps between the replicas. (In this context, gaps or overlaps are considered "significant" if they are on the order of the spacing between the spots or larger than this order.)

Alternatively or additionally, the illumination module may comprise a scan-expanding element, such as a convex reflector or a diffractive optical element (DOE), which expands the angular range covered by the scanned beam.

Other applications of and variations on the elements of a 3D mapping system using a scanned radiation source are described hereinbelow.

System Description

FIG. 1 is a schematic top view of system 20 for 3D mapping, in accordance with an embodiment of the present invention. System 20 is built around a mapping device 22, which is configured to capture images and generate 3D maps of a scene. The scene here includes an object 28, such as the hand of a user of the device. The depth information in the 3D maps generated by device 22 may be used, for example, by a host computer (not shown) as part of a 3D user interface, which enables the user to interact with games and other applications running on the computer and with elements shown on a display screen. (This sort of functionality is described, for instance, in U.S. Patent Application Publication 2009/0183125, whose disclosure is incorporated herein by reference.) This particular application of device 22 is mentioned here only by way of example, however, and the mapping capabilities of the device may be used for other purposes, as well, and applied to substantially any suitable types of scenes and 3D objects.

Figure 7:
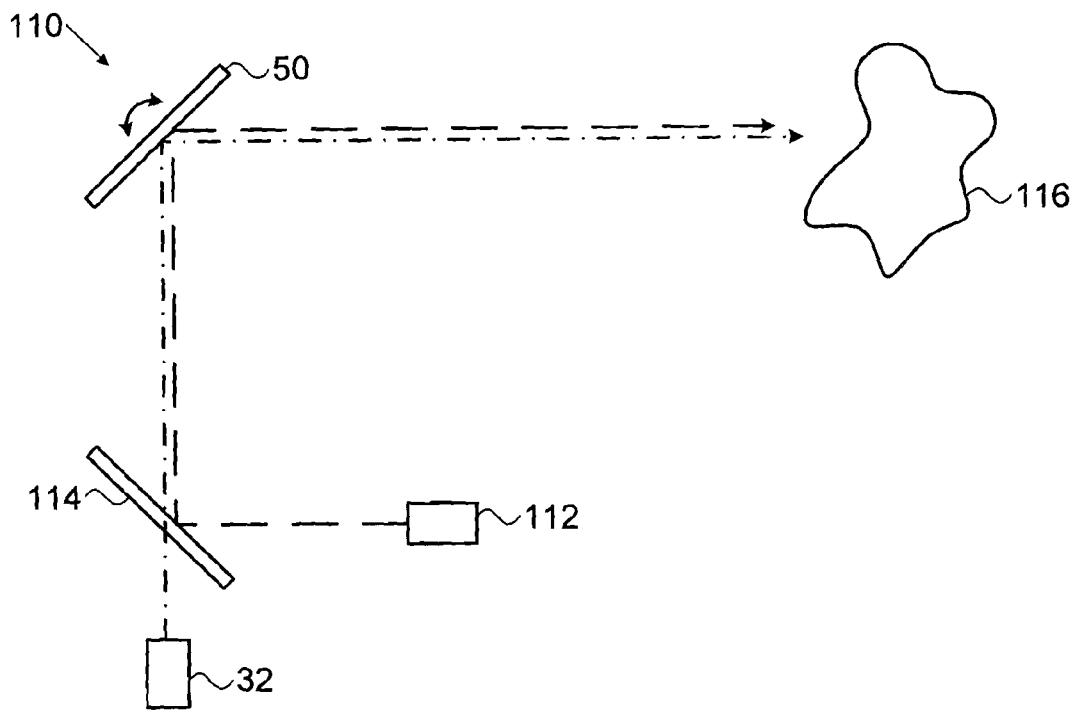
FIG. 7 is a schematic top view of an illumination module, in accordance with yet another embodiment of the present invention.

In the example shown in FIG. 1, an illumination module 30 in mapping device 22 projects a pattern of optical radiation onto object 28, as will be explained in detail hereinbelow. The optical radiation that is used for this purpose is typically in the infrared (IR) range, but visible or ultraviolet light may similarly be used. (In one embodiment, which is shown in FIG. 7, an illumination module projects both IR and visible radiation.) An imaging module 38 captures and decodes images of the pattern on the object in order to generate a digital shift value for each pixel in the image. The shift value represents the offset between an element of the pattern (typically a spot) in the area of each pixel in the captured image and a reference location of the corresponding pattern element in a reference image of the pattern. These offsets are indicative of respective distances between the point in the actual scene corresponding to the pixel and the image capture assembly. Alternatively, module 38 may output raw pixel values, and the shift values may be computed by another component of device 22 or by the host computer.

A processor 46 in device 22 processes the shift values (after computing the shift values from the raw pixel values output by module 38 if necessary) in order to generate a depth map of the region of interest that is illuminated and imaged by device 22. The depth map comprises an array of 3D coordinates, comprising a depth (Z) coordinate value of the object surface at each point (X,Y) within a predefined field of view. (In the context of an array of image-related data, these (X,Y) points are also referred to as pixels.) In the present embodiment, the processor computes the 3D coordinates of points on the surface of the object 28 by triangulation, based on the transverse shift of the pattern at each pixel. The principles of such triangulation computations are described, for example, in the above-mentioned PCT publications WO 2007/043036, WO 2007/105205 and WO 2008/120217.

In alternative embodiments, elements of device 22 may be used, mutatis mutandis, in other types of depth mapping systems, such as systems that are based on measurement of the time of flight of light pulses to and from the scene of interest or stereoscopic systems, as well as in other sorts of applications that use projected beams.

In FIG. 1, the X-axis is taken to be the horizontal direction along the front of device 22, the Y-axis is the vertical direction (out of the page in this view), and the Z-axis extends away from device 22 in the general direction of the object being imaged by the assembly. The optical axes of modules 30 and 38 are parallel to the Z-axis, with respective pupils on the X-axis at a known distance apart. In this configuration, the transverse shift of the pattern in the images captured by module 38 will be exclusively (to within tolerance errors) in the X-direction, as explained in the above-mentioned PCT publications.

As noted above, illumination module 30 illuminates the scene of interest with a pattern of spots, such as an uncorrelated pattern of spots. In the context of the present patent application and in the claims, the term "uncorrelated pattern" refers to a projected pattern of spots (which may be bright or dark), whose positions are uncorrelated in planes transverse to the projection beam axis. The positions are uncorrelated in the sense that the auto-correlation of the pattern as a function of transverse shift is insignificant for any shift that is larger than the spot size and no greater than the maximum shift that may occur over the range of depths mapped by the system.

Random, pseudo-random and quasi-periodic patterns are typically uncorrelated to the extent specified by the above definition.

To generate the pattern of spots, module 30 typically comprises a suitable radiation source 32, such as a collimated diode laser or a light-emitting diode (LED) or other light source with a radiation beam of appropriate shape. The beam is scanned over a range of angles by a suitable scanner 34 and illumination optics 35. The beam is modulated during the scan in order to generate the pattern. For example, the beam may be temporally modulated by turning source 32 on and off to create a binary pattern of spots or other forms. Optics 35 typically comprise one or more lenses and/or other optical components, which may take various different forms in different embodiments, as described below. The pattern is projected onto the scene over a certain angular range, which defines a projection field of view (FOV) 36, thus converting the temporal modulation of source 32 into a desired spatial intensity pattern extending over objects in the region of interest of system 20.

In the disclosed embodiments, scanner 34 comprises a scanning mirror 50 with a mechanical scan drive, although other types of scanners (such as acousto-optical scanners) may alternatively be used. Scanner 34 may comprise, for example, a bi-directional scanning mirror or a pair of uni-directional scanning minors. Such mirrors may be based on integrated micro-electromechanical systems (MEMS) technology. Scanning minors of this sort are produced by a number of manufacturers, such as Microvision, Inc. (Redmond, Wash.).

Imaging module 38 typically comprises objective optics 42, which form an image on a sensor 40 of the projected pattern appearing on the scene in the region of interest. In the example pictured in FIG. 1, sensor 40 comprises a CMOS image sensor, comprising a two-dimensional matrix of detector elements 41. The rows and columns of the matrix are aligned with the X and Y axes. Alternatively, other types of sensors may be used in module 38, as described below. Sensor 40 and objective optics 42 define an imaging field of view 44, which is typically contained within FOV 36 in the region of interest of device 22. Although sensor 40 is shown in FIG. 1 as having roughly equal numbers of rows and columns of detector elements 41, in other embodiments, which are described hereinbelow, the sensor may comprise only a small number of rows, or even only a single row or a single position-sensitive detector element.

As noted above, radiation source 32 typically emits IR radiation. Sensor 40 may comprise a monochrome sensor, without an IR-cutoff filter, in order to detect the image of the projected pattern with high sensitivity. To enhance the contrast of the image captured by sensor 40, optics 42 or the sensor itself may comprise a bandpass filter (not shown), which passes the wavelength of radiation source 32 while blocking ambient radiation in other bands.

Processor 46 typically comprises an embedded microprocessor, which is programmed in software (or firmware) to carry out the processing and control functions that are described herein. The processor may, for example, dynamically control illumination module 30 and/or imaging module 38 to adjust parameters such as the pattern density, brightness, and angular extent, as described in detail hereinbelow. A memory 48 may hold program code, lookup tables, and/or interim computational results. Alternatively or additionally, processor 46 may comprise programmable hardware logic circuits for carrying out some or all of its functions. Details of the implementation of a depth mapping processor, which may be applied to processor 46, are provided in U.S. Patent Application Publication 2010/0007717, whose disclosure is incorporated herein by reference.

Scanning Illumination Modules

Figure 2A:
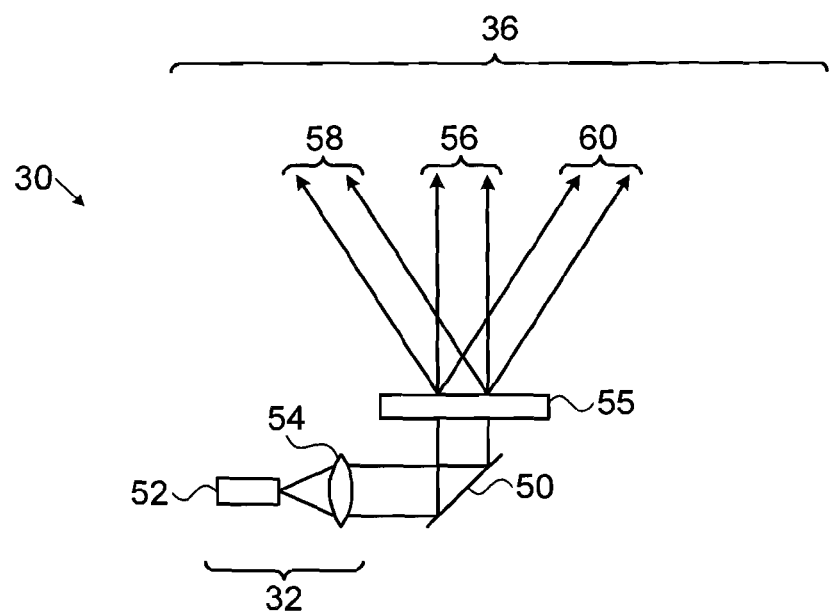
FIGS. 2A and 2B are schematic top views of an illumination module in two different phases of operation, in accordance with an embodiment of the present invention.
Figure 2B:
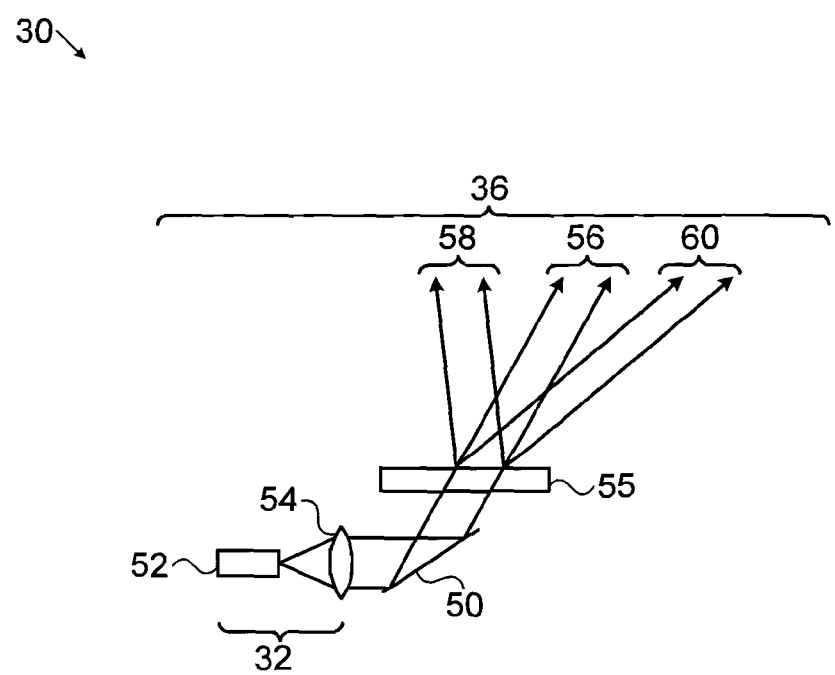

FIGS. 2A and 2B are schematic top views of illumination module 30 in two different phases of operation, in accordance with an embodiment of the present invention. In this embodiment, radiation source 32 comprises a laser diode 52 and a collimating lens 54. The beam from the radiation source is scanned by scanning minor 50 over a range of angles, which is limited by the mechanical and optical properties of the scanner. (The scanning mechanism is omitted from this and subsequent figures for the sake of simplicity.) FIG. 2A shows the mirror at roughly the center of the scan, while in FIG. 2B the minor is at its most extreme deflection. This deflection defines the maximal angular range that can be covered by the scanned beam.

To expand this range, a beamsplitter 55, such as a suitable diffractive optical element (DOE), splits the scanned beam to create multiple, angularly-spaced replicas 56, 58, 60 of the scanned beam. (In the absence of the beamsplitter, module 30 would project only beam 56.) As minor 50 scans the radiation beam, replicas 56, 58, 60 sweep in parallel over the region of interest, covering an angular range that is greater than the scan range provided by the scanner alone. Although for the sake of simplicity, FIGS. 2A and 2B show three replica beams, beamsplitter 55 may alternatively be configured to give only two replica beams or to give a larger number of replica beams. In general, beamsplitter 55 can be configured to generate substantially any array of m×n beam replicas, in substantially any desired layout, depending on the application requirements.

Figure 2C:
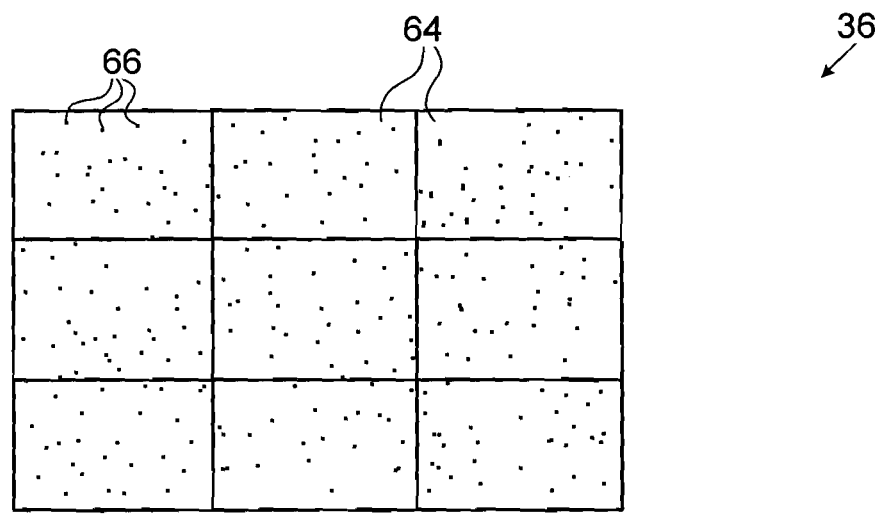
FIG. 2C is a schematic frontal view of a pattern projected by the module of FIGS. 2A and 2B, in accordance with an embodiment of the present invention.

FIG. 2C is a schematic frontal view of the radiation pattern projected by the illumination module of FIGS. 2A and 2B, in accordance with an embodiment of the present invention. On/off modulation of laser diode 52 causes each beam replica 56, 58, 60, . . . , to create a respective pattern 64 of spots 66 within a corresponding sub-area of field of view 36. The fan-out angle of beamsplitter 55 and the angular scanning range of scanner 34 are typically chosen so that patterns 64 tile the region of interest, with substantially no holes and no overlap between the patterns. This sort of tiling arrangement can be used efficiently to project patterns over a wide angular range in 3D mapping systems. Alternatively, the fan-out angle and scanning range may be chosen so that patterns 64 overlap. The patterns may be spot patterns, as in the pictured embodiment, or may comprise other types of structured light.

Figure 3:
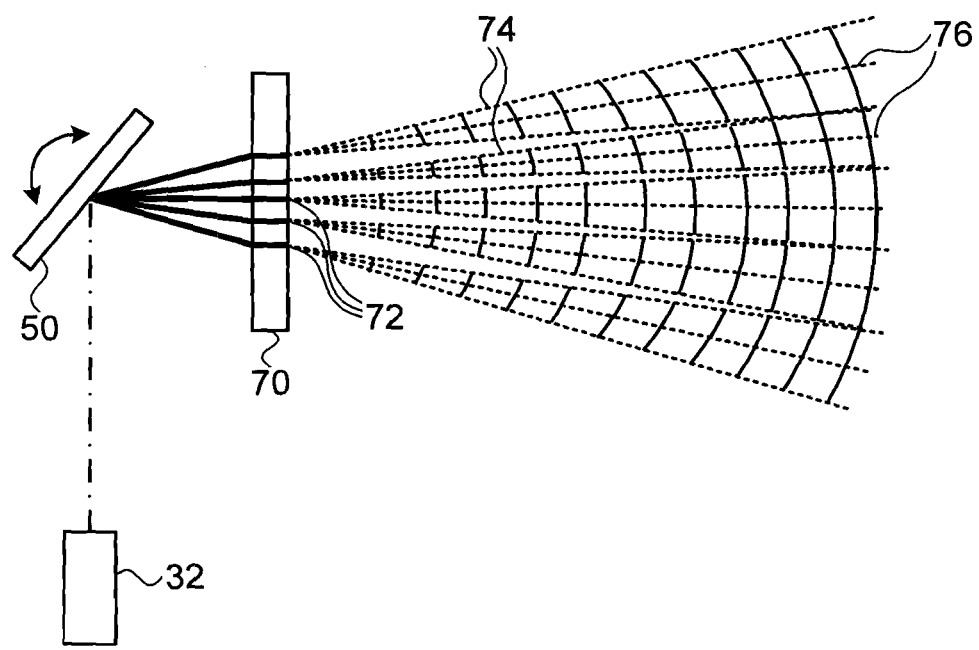
FIGS. 3-5 are schematic top views of illumination modules, in accordance with other embodiments of the present invention.

FIG. 3 is a schematic side view of illumination module 30, in accordance with an alternative embodiment of the present invention. This embodiment may be used to create the same sort of tiled pattern that is shown in FIG. 2C. It differs from the other embodiments described here, however, in that it uses a diffractive optical element (DOE) 70 as a spatial modulator to create the patterned illumination of the scene, in conjunction with scanning mirror 50. As a result of this arrangement, the demands on minor 50 are reduced, so that a much slower scan rate is possible, or mirror 50 may simply jump between discrete positions, and illumination source 32 can be pulsed on and off at a much slower rate.

In terms of optical principles, this embodiment is similar to DOE-based schemes that are described in U.S. Patent Application Publications 2009/0185274 and 2010/0284082, both of which are incorporated herein by reference. These publications describe methods for creating diffraction patterns using a pair of DOEs, one of which splits an input beam into a matrix of output beams, while the other applies a pattern to each of the output beams. The two DOEs together thus project radiation onto a region in space in multiple adjacent instances of the pattern.

In the present embodiment, the scan pattern of mirror 50 takes the place of one of the DOEs in splitting the input beam from radiation source 32 into multiple intermediate beams 72. For this purpose, mirror 50 scans in the X- and Y-directions to each of a matrix of predetermined angles and dwells at each of these angles for a certain period of time, typically on the order of a few milliseconds. Each dwell point defines a beam 72. DOE 70 diffracts each of beams 72 into a patterned output beam 74, along a respective axis 76. The fan-out angle between axes 76 and the divergence angle of beams 74 may be chosen (by appropriate design of DOE 70 and of the scan pattern of mirror 50) so that beams 74 tile field of view 36, in the manner shown in FIG. 2C.

The embodiment of FIG. 3 may operate in conjunction with various types of image capture modules 38, as described below. Because beams 74 are illuminated in sequence, it is desirable that the image capture pattern of module 38 be synchronized with the illumination sequence in order to maximize the signal/background ratio in the captured images of the scene of interest. Certain types of image sensors, such as CMOS sensors, have a rolling shutter, which may be synchronized with the illumination sequence using techniques that are described, for example, in U.S. patent application Ser. No. 12/762,373, filed Apr. 19, 2010, whose disclosure is incorporated herein by reference.

Figure 4:
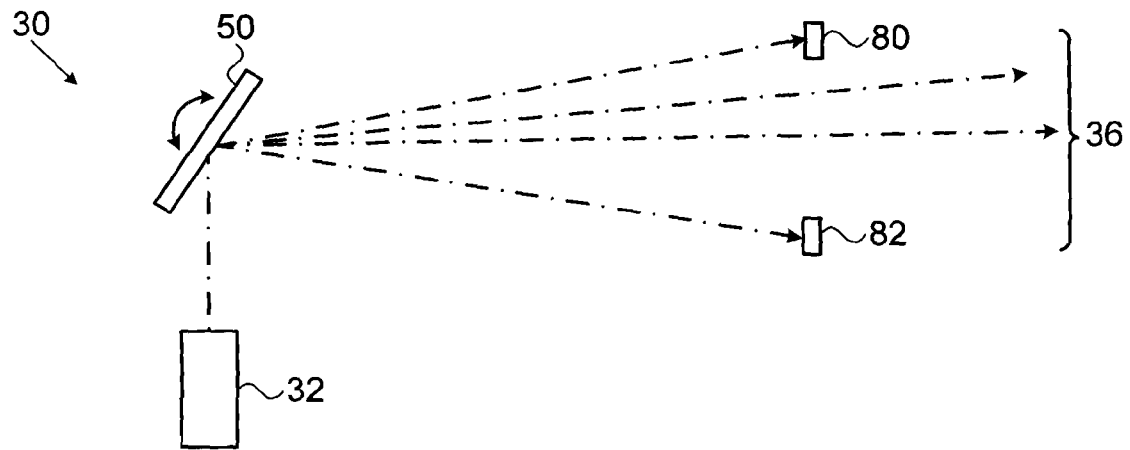

FIG. 4 is a schematic side view of illumination module 30, in accordance with another embodiment of the present invention. Assuming source 32 to be a laser, the beam it emits is intense and should be scanned continuously by minor 50 to ensure eye safety. In normal operation of module 30, source 32 emits the beam only while mirror 50 is moving, so that the dwell time at all locations in field of view 36 is short and therefore does not pose any danger to the eye. If the mechanism that drives mirror 50 sticks or otherwise malfunctions, however, the beam may dwell at one location for an extended period.

To avoid this eventuality, module 30 comprises one or more beam sensors 80, 82, . . . , such as photodiodes, which are coupled to processor 46 (not shown in this figure). These sensors are positioned at a selected angle or angles within the angular range that is scanned by mirror so as to receive the scanned beam periodically and thus verify that the scanner is operating. In this example, two sensors are shown on opposite sides of FOV 36, but a single safety sensor or a larger number of such sensors may alternatively be used.

The mechanism that drives mirror 50 may be programmed, for example, to direct the beam from source 32 toward sensor 80 at the beginning of each scan and toward sensor 82 at the end of each scan. When the beam strikes one of the sensors, that sensor outputs a pulse to processor 46. The processor monitors the pulses and tracks the time elapsed from pulse to pulse. If the time exceeds a preset maximum, the processor will immediately inhibit emission of the beam from radiation source 32 (typically by simply shutting it off). This sort of timing event will occur if mirror 50 gets stuck at a given location. Thus, in such a case, the beam from module 30 will be immediately shut off, and any potential safety hazard will be averted.

Figure 5:
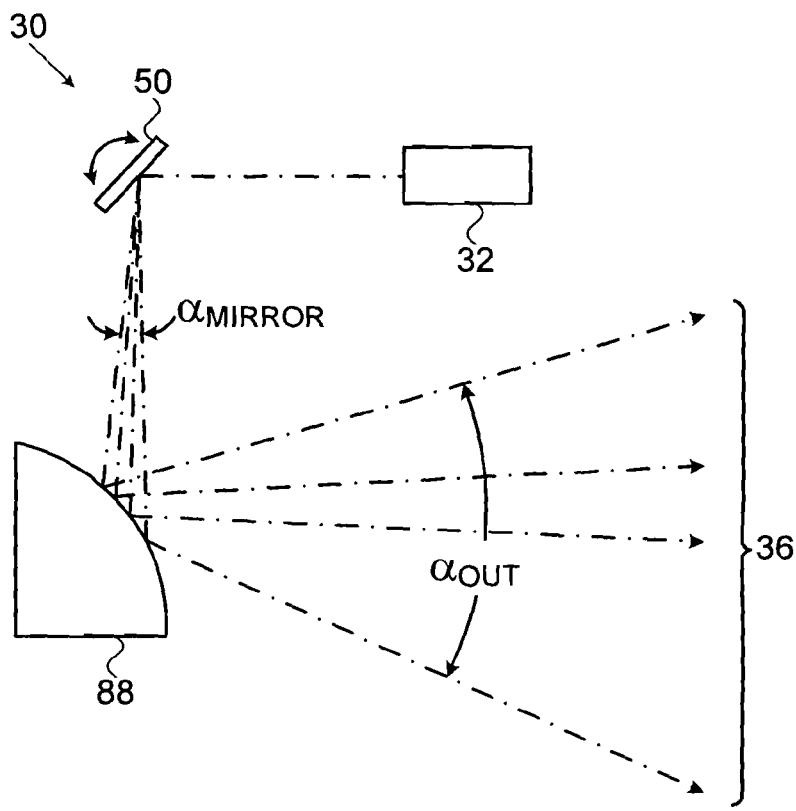

FIG. 5 is a schematic side view of projection module 30, in accordance with yet another embodiment of the present invention. This embodiment is directed particularly toward expanding FOV 36 relative to the scanning range of minor 50. It addresses the problem that in certain technologies, such as MEMS, the scanning range of mirror 50 is small, while some 3D mapping applications call for mapping over a wide field.

In the pictured embodiment, minor 50 scans over an angular range equal to $\alpha_{mirror}/2$, giving an initial FOV of width $\pi_{mirror}$, typically on the order of 10-30°. The beam from minor 50 strikes a scan-expanding element—in this case a convex reflector 88—which expands the beam range so that FOV 36 has width $\alpha_{out}$, which may be on the order of 60-120°. For two-dimensional (X-Y) scanning, element 60 may be spherical, or it may have a surface with different radii of curvature in the X and Y directions in order to generate a field of view that is wider in one dimension than the other, or it may have some other aspheric shape. Alternatively, the scan-expanding reflector may be replaced by a DOE or a refractive element (not shown) with similar scan-expanding properties. Further alternatively, the function of reflector 88 may be fulfilled by a combination of optical elements of the same or different types.

Figure 6:
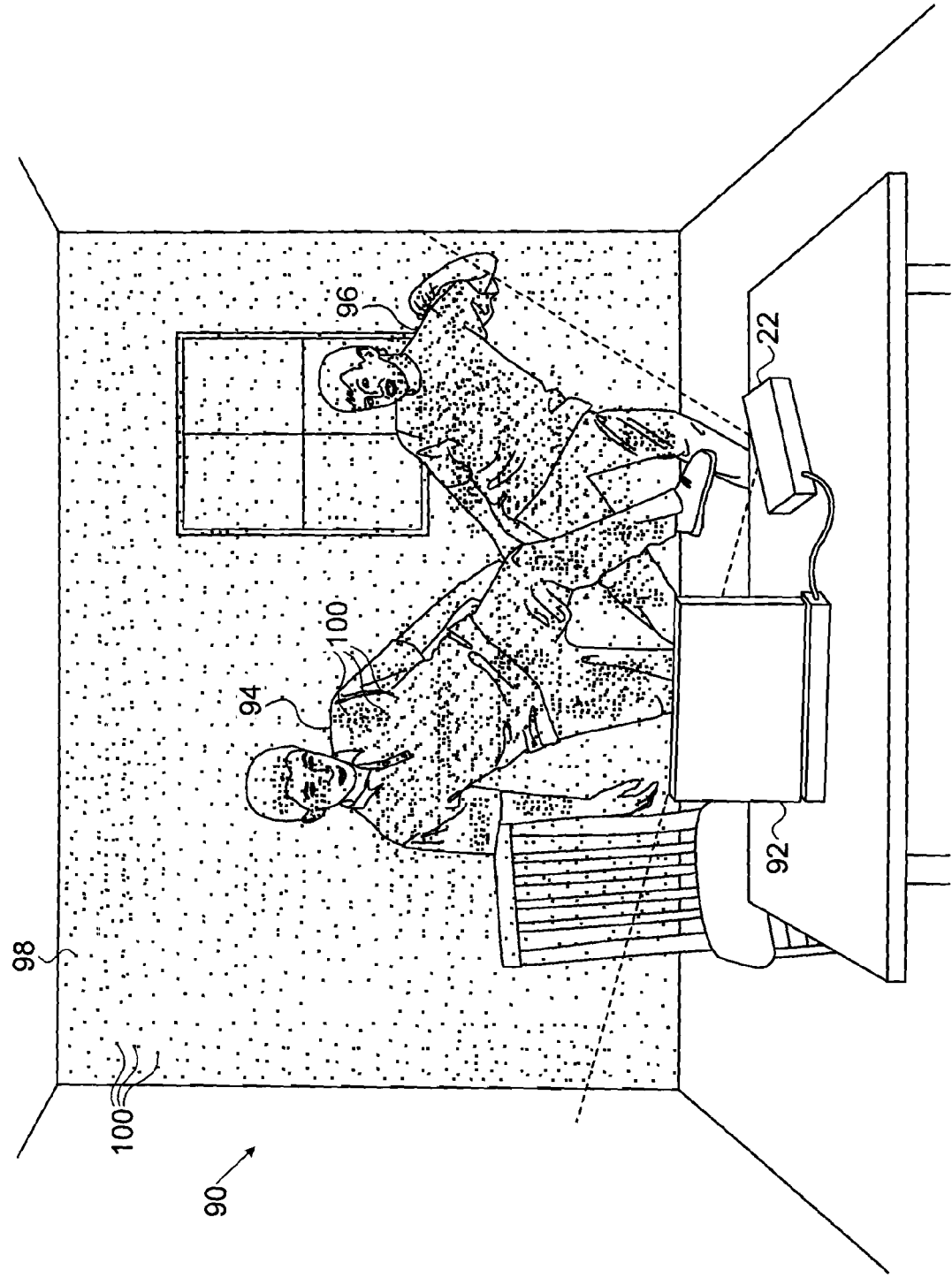
FIG. 6 is a schematic, pictorial view of a 3D mapping system in operation, in accordance with an embodiment of the present invention.

FIG. 6 is a schematic, pictorial view of a 3D mapping system 90 in operation, in accordance with an embodiment of the present invention. In this system, device 22 is used in conjunction with a game console 92 to operate an interactive game, with two participants 94 and 96. For this purpose, device 22 projects a pattern of spots 100 onto objects in its field of view, including the participants and a background 98, such as the wall (and other elements) of the room in which system 90 is located. Device 22 captures and processes an image of the pattern, as explained above, in order to create a 3D map of the participants and other objects in the scene. Console 92 controls the game in response to the participants' body movements, which are detected by device 22 or console 92 by segmenting and analyzing changes in the 3D map.

System 90 is shown here in order to exemplify some of the difficulties that may be encountered by 3D mapping systems. Objects in the mapped scene may vary greatly in size, and frequently small objects (such as the participants' hands, legs and heads) move and change their apparent form quickly. Furthermore, it is often just these objects that need to be mapped accurately for purposes of the game running on console 92 and other interactive applications. At the same time, different objects in the region of interest may reflect the patterned illumination back to device 22 with widely-varying intensity, due both to variations in reflectance and to large differences in distance from the device. As a result, some areas of the pattern in the images captured by imaging module 38 may be too dim to give accurate depth readings.

To overcome these problems, illumination module 30 in device 22, projects the pattern adaptively, changing the density and/or brightness of the pattern in response to the geometry of the scene. The information about scene geometry is provided by the images captured by imaging module 38 and/or by the 3D maps that are generated by processing these images. Thus, radiation source 32 and scanner 34 are controlled dynamically, during operation of system 90, to project spots 100 with greater density on objects of importance that are either small or rapidly varying, or otherwise require closer attention or better depth coverage, such as the bodies of participants 94 and 96. On the other hand, large smooth objects, such as background 98, are covered with a sparser pattern. Device 22 may adjust the pattern density adaptively in successive images, in response to changes in the scene.

Additionally or alternatively, device 22 may adjust the output power of radiation source 32 dynamically, in order to compensate for variations in distance and reflectivity within the captured scene. Thus, illumination module may project spots with greater brightness toward objects that have low reflectivity or are far from device 22, such as background 98, while reducing the projected power on bright, nearby objects. Alternatively or additionally, the local scanning speed of the mirror, and thus the dwell time at each location in the scan range, may be controlled to give longer local dwell time, and hence greater local projected energy, in areas requiring greater illumination. These sorts of adaptive power control enhance the dynamic range of system 90 and optimizes the use of available radiation power.

As a further aspect of the dynamic operation of system 90 (not illustrated in FIG. 6), the angular ranges of the illumination and imaging modules in device 22 may also be adjusted dynamically. For example, after first capturing a wide-angle image and creating a wide-angle, low-resolution 3D map of the region of interest, device 22 may be controlled to zoom in on particular objects that have been identified within the region. Thus, the angular scan range of the projected pattern and sensing range of the imaging module may be reduced to provide higher-resolution depth maps of the bodies of participants 94 and 96. As the participants move within the scene, the scan and sensing ranges may be adjusted accordingly.

FIG. 7 is a schematic side view of an illumination module 110, in accordance with still another embodiment of the present invention. Module 110 may be used in place of module 30 in device 22 (FIG. 1), and offers added capabilities in using the same scanning hardware to simultaneously project both the IR pattern (for 3D mapping) and visible content that can be viewed by a user of the device.

In this sort of embodiment, device 22 may create a 3D map of a given object using the IR pattern, and may then project onto the object a visible image that is tailored to the shape and contours of the object. This sort of capability is useful, for example, in presenting user interface graphics and text, and particularly in "augmented reality" applications (for which device 22 may even be integrated into goggles worn by the user so that mapping and visible image projection are aligned with the user's field of view). Applications of this sort are described, for example, in PCT Patent Application PCT/IB2011/053192, filed Jul. 18, 2011, whose disclosure is incorporated herein by reference.

As shown in FIG. 7, a beam combiner 114, such as a dichroic reflector, aligns the IR beam from radiation source 32 with a visible beam from a visible light source 112. Source 112 may be monochromatic or polychromatic. For example, source 112 may comprise a suitable laser diode or LED for monochromatic illumination, or it may comprise multiple laser diodes or LEDs of different colors (not shown), whose beams are modulated and combined in order to project the desired color at each point in the field of view. For this latter purpose, combiner 114 may comprise two or more dichroic elements (not shown) in order to align all of the different colored and IR beams.

As mirror 50 scans over FOV 36, processor 46 modulates sources 32 and 72 simultaneously: Source 32 is modulated to generate the desired pattern for 3D mapping at each point in the field, while source 112 is modulated according to the pixel value (intensity and possibly color) of the visible image that is to be projected at the same point (which may be based on the 3D map of the object at that point). Because the visible and IR beams are optically aligned and coaxial, the visible image will be automatically registered with the 3D map.

Image Capture Configurations

Figure 8:
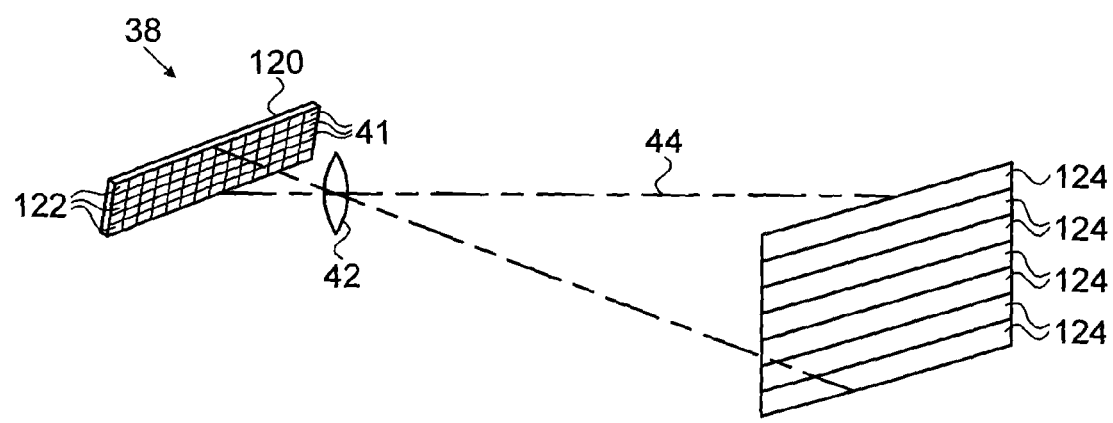
FIGS. 8 and 9 are schematic, pictorial views of imaging modules, in accordance with embodiments of the present invention.

FIG. 8 is a schematic pictorial view of imaging module 38, in accordance with an embodiment of the present invention. This embodiment takes advantage of synchronization between the scan pattern of illumination module 30 and the readout pattern of the imaging module. This synchronization makes it possible to use an image sensor 120 with a relatively small number of rows 122 of detector elements 41 relative to the number of columns. In other words, the image sensor itself has low resolution in the Y-direction (the vertical direction in the figure), but high resolution in the X-direction. In the pictured embodiment, image sensor 80 has less than ten rows and may have, for example, one thousand or more columns. Alternatively, the image sensor may have larger or smaller numbers of rows, but still far fewer rows than columns.

Objective optics 42 comprise an astigmatic imaging element, which maps field of view 44 onto image sensor 120. Optics 42 have larger magnification in the Y-direction than in the X-direction, so that each row 122 of the image sensor captures light from a corresponding rectangular area 124 in the field of view. For example, the aspect ratio of each rectangular area 124 may be on the order of 10:1 (X:Y), while rows 122 have an aspect ratio on the order of 1000:1. The different X- and Y-magnifications of optics 42 may be chosen in any desired ratio, depending on the number of rows and columns in the image sensor and the desired dimensions of the field of view. In one embodiment, for example, optics 42 may comprise a cylindrical lens, and sensor 120 may comprise only a single row of detector elements.

Illumination module 30 scans the beam from radiation source 32 over field of view 44 in a raster pattern, covering each of areas 124 with multiple horizontal scan lines. As each line in a given area 124 is scanned by the spot from the illumination module, the corresponding row 122 captures the radiation reflected from the scene. Readout from sensor 120 is synchronized with the illumination scan, so that the rows 122 of detector elements 41 are read out substantially only when the corresponding areas 124 in the scene are illuminated by the scan. As a result, the length of time during which each row 122 integrates ambient light for each readout is reduced, and the signal/ambient ratio in the output of sensor 120 is thus enhanced.

The resolution of the images captured by module 38 in this embodiment is governed by the resolution of the illumination scan, as each row 122 of sensor 120 is read out multiple times in synchronization with the scan. In other words, the first row is scanned multiple times while illumination module scans the corresponding area 124, followed by multiple scans of the second line, then the third line, etc. For example, if the first row in the image sensor is responsible for capturing the first hundred scan lines of the illumination module (1/10 of the vertical FOV), then it is scanned one hundred times before the second line is scanned. For this purpose, sensor 120 includes suitable readout circuits (not shown), similar to the readout circuits in a conventional, full-resolution CMOS image sensor, for example. Alternatively, a vertical fan-out element may be used on the illumination side, and the lines of the image sensor may scan simultaneously, each synchronized with the corresponding illumination scan.

Alternatively, the scanning of image sensor 120 may be vertically multiplexed in synchronization with the illumination scan. In this scheme, for example, using an imaging sensor with one hundred rows, the first row of the image sensor captures, for example, the first, $101^{st}$, $201^{st}$, $301^{st}$ scan line, etc., of the illumination scan. Additionally or alternatively, imaging module 38 may implement the sort of spatially-multiplexed imaging schemes that are described, for example, in U.S. Provisional Patent Application 61/419,891, filed Dec. 6, 2010, whose disclosure is incorporated herein by reference. A combination of the above scanning techniques can also be used.

The arrangement of image capture module 38 that is shown in FIG. 8 maintains full resolution in the X-direction, while relying on the synchronized scan of illumination module 30 to provide Y-direction resolution. This embodiment thus allows image sensor 120 to be made smaller and less costly, with simpler readout circuits, while potentially affording increased resolution in the X-direction. This X-resolution is useful, since in the configuration shown in FIG. 1, only the X-direction shift of the pattern in images captured by module 38 is indicative of depth variations within the scene, as explained above. The high resolution in the X-direction thus provides accurate readings of spot offset, which in turn enable accurate computation of depth coordinates.

Figure 9:
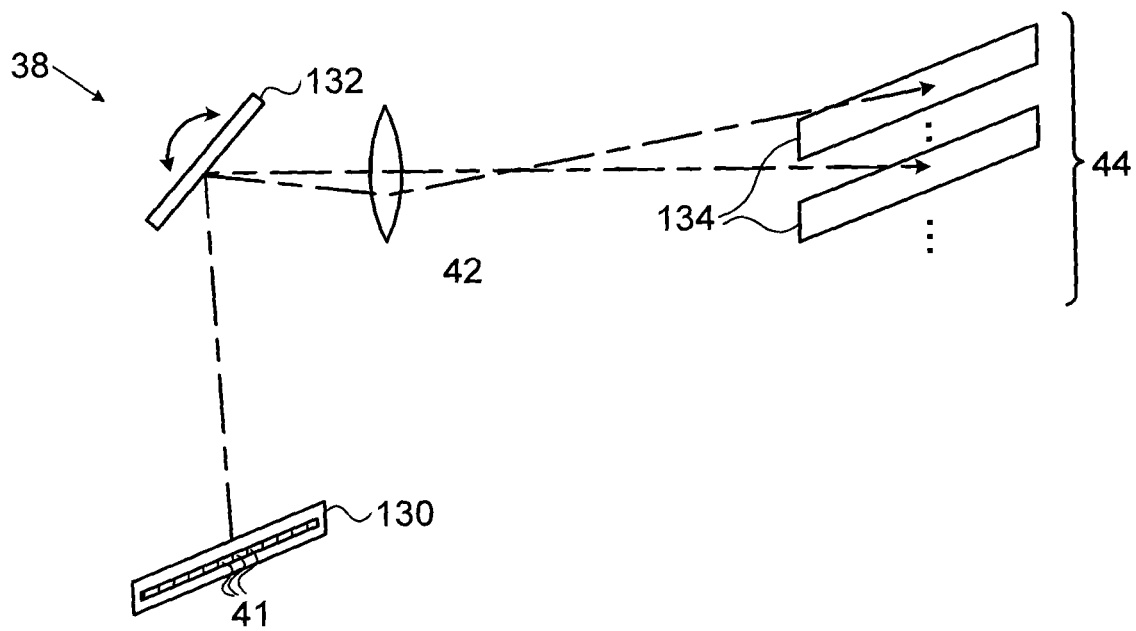

FIG. 9 is a schematic pictorial view of imaging module 38, in accordance with another embodiment of the present invention. This embodiment also takes advantage of synchronization between the scan pattern of illumination module 30 and the readout pattern of the imaging module. In this case, however, field of view 44 of imaging module 38 is actively scanned.

In the embodiment of FIG. 9, image capture module 38 comprises a position-sensitive detector 130, which is configured to sense and output an X-offset of each spot in the pattern that is projected onto the object by illumination module 30. In other words, as module 30 projects each spot in turn onto the corresponding location in the region of interest, detector 130 senses its image and indicates its respective offset from the corresponding reference spot location (and thus the depth coordinate in the scene at that location). Detector 130 is shown in the figure as a line-scan sensor 90 with a single row of detector elements 41 extending in the X-direction. Alternatively, position-sensitive detector 130 may comprise a unitary detector element with an analog readout indicating the location of the spot that is currently imaged onto the detector.

In the pictured embodiment, objective optics 42 map a rectangular area 134 in field of view 44 onto the row of detector elements 41 in sensor 130. Optics 42 may, as in the preceding embodiment, be astigmatic, with greater optical power in the X-direction than in the Y-direction, so that area 134 has a lower aspect ratio (X:Y) than the row of detector elements in the sensor. A scanning mirror 132 scans area 134 over field of view 44 in the Y-direction, in synchronization with the raster scan of illumination module 30, so that area 134 always contains the horizontal line that is currently under patterned illumination. In this manner, the image capture module captures an image of the pattern on the scene with high resolution and high signal/ambient ratio, while using a simple one-dimensional sensor.

Figure 10:
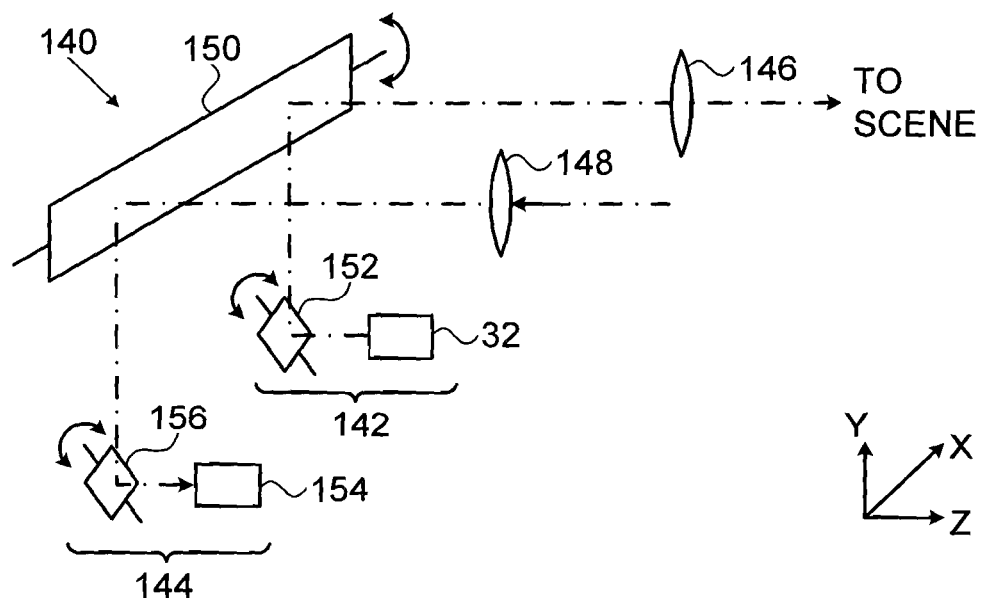
FIG. 10 is a schematic, pictorial view of a 3D mapping device, in accordance with an embodiment of the present invention.

FIG. 10 is a schematic, pictorial view of a 3D mapping device 140, in accordance with still another embodiment of the present invention. In this embodiment, the fields of view of an illumination module 142 and an imaging module 144 are jointly scanned in the Y-direction by a common minor 150. Illumination module 142 comprises radiation source 32 and a beam scanner, in the form of a scanning minor 152, which scans the radiation beam in the X-direction. Imaging module 144 comprises a detector 154, whose field of view is scanned in the X-direction by an imaging scanner comprising a scanning minor 156, in synchronization with scanning minor 152. Projection optics 146 project the illumination beam onto the region of interest of device 140 in order to create the desired pattern of spots on objects in the scene, and objective optics 148 image the spots onto detector 154.

The sensing area of imaging module 144 is thus scanned over the region of interest in synchronization with the scanned beam of illumination module 142. Detector 154 may comprise, for example, a position-sensitive detector as in the embodiment of FIG. 9 or a small-area image sensor, with detector elements arranged in rows and columns. As in the preceding embodiments, imaging module 144 provides measurements of spot offset, which may then be processed to generate a depth map. Although minor 150 in FIG. 10 is conveniently shared by both the illumination and imaging modules, each module may alternatively have its own, synchronized Y-direction scanning minor. In this latter case, all the minors in device 140 could be produced using MEMS technology. As the Y-direction scan is relatively slow, however, the single mirror 150 with a stepped drive is feasible for this application and is advantageous in maintaining precise synchronization.

The arrangement shown in FIG. 10 can be used to implement dynamic control not only of the spot density and brightness in the projected pattern, but also of the scan area, as explained above. Mirrors 150 and 152 may be operated to vary the angular range over which the illumination beam is scanned, and mirrors 150 and 156 will then scan the sensing area of detector 154 to match the angular range of the scanned beam. In this way, for example, device 140 may first be operated to capture a coarse 3D map of an entire scene, covering a wide angular range. The 3D map may be segmented in order to identify an object of interest, and the scan ranges of the illumination and imaging assemblies may then be dynamically adjusted to capture and map only the area of the object with high resolution. Other applications of this sort of dynamic control will be apparent to those skilled in the art and are considered to be within the scope of the present invention.

A number of specific ways to enhance scanning architectures for pattern projection and image capture have been shown and described above. These embodiments illustrate, by way of example, how aspects of the present invention can be used, inter alia, to improve eye safety, to increase field of view, to simultaneously use the same scanning hardware to project both IR patterns and visible content, and to reduce the size of the imaging module by synchronizing it with the illumination module. Alternative implementations and combinations of the above embodiments are also considered to be within the scope of the present invention. Such schemes may use various combinations of scanning projection for 3D mapping, as well as projection of visible information; diffractive optics to shape or split the scanning beam; refractive and/or diffractive optics to enlarge the field of view of the projection system; and synchronized scanning of projection and image capture.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for mapping, comprising:
   an illumination module, comprising:
      a radiation source, which is configured to emit a beam of radiation;
      a scanner, which is configured to receive and scan the beam over a selected angular range; and
      illumination optics, which are configured to project the scanned beam so as to create a pattern of spots extending over a region of interest;

an imaging module, which is configured to capture an image of the pattern that is projected onto an object in the region of interest; and a processor, which is configured to process the image in order to construct a three-dimensional (3D) map of the object.

2. The apparatus according to claim 1, wherein the pattern of the spots is uncorrelated over a range of depths that is mapped by the apparatus.

3. The apparatus according to claim 1, wherein the radiation source is controlled so as to modulate an intensity of the beam while the scanner scans the beam, thereby creating the pattern of the spots on the region of interest.

4. The apparatus according to claim 3, wherein the illumination module is configured to modify the pattern responsively to the image captured by the imaging module.

5. The apparatus according to claim 4, wherein the illumination module is configured to control at least one of the radiation source and the scanner so as to modify an angular density of the spots in the array within a selected part of the region of interest.

6. The apparatus according to claim 4, wherein the illumination module is configured to control at least one of the radiation source and the scanner so as to modify a brightness of the spots in a selected area with the region of interest.

7. The apparatus according to claim 3, wherein the scanner is configured to scan the beam over a first angular range, and wherein the optics comprise a beamsplitter, which is configured to create multiple, angularly-spaced replicas of the scanned beam, which together extend over a second angular range, which is greater than the first angular range.

8. The apparatus according to claim 7, wherein the scanner and the beamsplitter are configured to tile the region of interest with the pattern created by the multiple, angularly-spaced replicas of the scanned beam.

9. The apparatus according to claim 1, wherein the optics comprise a patterned element, which is configured, when illuminated by the beam, to create the pattern over a first angular range, and wherein the scanner is configured to direct the beam to strike the patterned element at multiple different angles in succession so as to create multiple, angularly-spaced replicas of the pattern, which together extend over a second angular range, which is greater than the first angular range.

10. The apparatus according to claim 9, wherein the scanner and the patterned element are configured to tile the region of interest with the multiple, angularly-spaced replicas of the pattern.

11. The apparatus according to claim 1, wherein the scanner is configured to scan the beam over a first angular range, and wherein the optics comprise a scan-expanding element, which is configured to distribute the scanned beam so as to cover a second angular range, greater than the first angular range, with the spatial pattern.

12. The apparatus according to claim 11, wherein the scan-expanding element is selected from a group of elements consisting of a convex reflector and a diffractive optical element.

13. The apparatus according to claim 1, wherein the illumination module comprises at least one beam sensor, which is positioned at a selected angle within the angular range that is scanned by the scanner so as to receive the scanned beam periodically and verify thereby that the scanner is operating.

14. The apparatus according to claim 13, wherein the illumination module is configured to inhibit emission of the beam from the radiation source when the sensor fails to receive the scanned beam periodically.

15. The apparatus according to claim 1, wherein the radiation source comprises:

a first radiation source, which emits an infrared beam, which is modulated to create the pattern of the spots; and a second radiation source, which emits a visible light beam, which is modulated to project a visible image onto the region of interest, wherein the scanner and optics are configured to project both the infrared beam and the visible light beam onto the region of interest simultaneously.

16. The apparatus according to claim 15, wherein the second radiation source is controlled so as to project the visible image onto the object responsively to the 3D map.

17. The apparatus according to claim 1, wherein the processor is arranged to derive the 3D map by finding respective offsets between the spots in areas of the captured image and corresponding reference spot locations belonging to a reference image of the pattern, wherein the respective offsets are indicative of respective distances between the areas and the image capture assembly.

18. The apparatus according to claim 17, wherein the imaging module comprises a position-sensitive detector, which is configured to sense and output an offset of each spot in the pattern on the object as the spot is projected by the illumination module.

19. The apparatus according to claim 18, wherein the imaging module is configured to scan a field of view of the position-sensitive detector in synchronization with the scanner in the illumination module.

20. The apparatus according to claim 18, wherein the scanner is configured to scan a field of view of the position-sensitive detector together with the beam from the radiation source.

21. The apparatus according to claim 17, wherein the illumination module and the imaging module are arranged so that the offsets occur in a first direction, and wherein the imaging module comprises:

an array of detector elements arranged in one or more rows extending in the first direction; and astigmatic optics, which are configured to image the pattern onto the array and have a greater optical power in the first direction than in a second, perpendicular direction.

22. The apparatus according to claim 1, wherein the imaging module comprises a sensor and imaging optics, which define a sensing area that is scanned over the region of interest in synchronization with the scanned beam of the illumination module.

23. The apparatus according to claim 22, wherein the sensor comprises an image sensor having a rolling shutter, and wherein the rolling shutter is synchronized with the scanned beam.

24. The apparatus according to claim 22, wherein the scanner in the illumination module is controllable to dynamically vary the selected angular range, and wherein the imaging module comprises an imaging scanner, which is configured to dynamically scan the sensing area to match the selected angular range of the scanned beam.

25. Apparatus for mapping, comprising:

an illumination module, comprising:

a radiation source, which is configured to emit a beam of radiation having an intensity that varies according to a specified temporal modulation; and a scanner, which is configured to receive and scan the beam over a region of interest, so as to project the radiation onto the region with a spatial intensity pattern determined by the temporal modulation of the beam;

an imaging module, which is configured to capture an image of the spatial intensity pattern that is projected onto an object in the region of interest; and a processor, which is configured to process the image in order to construct a three-dimensional (3D) map of the object.

26. The apparatus according to claim 25, wherein the temporal modulation is binary, and wherein the spatial intensity pattern comprises an array of spots generated by the temporal modulation.

27. The apparatus according to claim 25, wherein the processor is arranged to derive the 3D map by finding respective offsets between the pattern in areas of the captured image and a reference image of the pattern, wherein the respective offsets are indicative of respective distances between the areas and the image capture assembly.

28. The apparatus according to claim 25, wherein the imaging module comprises a sensor and imaging optics, which define a sensing area that is scanned over the region of interest in synchronization with the scanned beam of the illumination module.

29. A method for mapping, comprising:
  scanning a beam of radiation over a selected angular range so as to create a pattern of spots extending over a region of interest;
  capturing an image of the pattern that is projected onto an object in the region of interest; and
  processing the image in order to construct a three-dimensional (3D) map of the object.

30. The method according to claim 29, wherein the pattern of the spots is uncorrelated over a range of depths that is mapped by the method.

31. The method according to claim 29, wherein scanning the beam comprises modulating an intensity of the beam while the scanning the beam, thereby creating the pattern of the spots on the region of interest.

32. The method according to claim 31, wherein creating the pattern comprises modifying the pattern responsively to the image captured by the imaging module.

33. The method according to claim 32, wherein modifying the pattern comprises modifying an angular density of the spots in the array within a selected part of the region of interest.

34. The method according to claim 32, wherein modifying the pattern comprises modifying a brightness of the spots in a selected area with the region of interest.

35. The method according to claim 31, wherein creating the pattern comprises scanning the beam over a first angular range, and splitting the scanned beam to create multiple, angularly-spaced replicas of the scanned beam, which together extend the pattern over a second angular range, which is greater than the first angular range.

36. The method according to claim 35, wherein splitting the scanned beam comprises tiling the region of interest with the pattern created by the multiple, angularly-spaced replicas of the scanned beam.

37. The method according to claim 29, wherein scanning the beam comprises illuminating a patterned element, which is configured, when illuminated by the beam, to create the pattern over a first angular range, while directing the beam to strike the patterned element at multiple different angles in succession so as to create multiple, angularly-spaced replicas of the pattern, which together extend over a second angular range, which is greater than the first angular range.

38. The method according to claim 37, wherein directing the beam comprises tiling the region of interest with the multiple, angularly-spaced replicas of the pattern.

39. The method according to claim 29, wherein scanning the beam comprises directing the beam, which is scanned over a first angular range, to strike a scan-expanding element, which is configured to distribute the scanned beam so as to cover a second angular range, greater than the first angular range, with the spatial pattern.

40. The method according to claim 39, wherein the scan-expanding element is selected from a group of elements consisting of a convex reflector and a diffractive optical element.

41. The method according to claim 29, and comprising sensing the scanned beam at a selected angle within the angular range, and verifying the scanning by sensing the scanned beam periodically at the selected angle.

42. The method according to claim 41, wherein scanning the beam comprises inhibiting emission of the beam upon a failure to sense the scanned beam periodically.

43. The method according to claim 29, wherein scanning the beam comprises scanning an infrared beam, which is modulated to create the pattern of the spots, and wherein the method comprises scanning a visible light beam together with the infrared beam, while modulating the visible light beam so as to project a visible image onto the region of interest simultaneously with projecting both the infrared beam and the visible light beam onto the region of interest simultaneously.

44. The method according to claim 43, wherein modulating the visible light beam comprises generating the visible image responsively to the 3D map.

45. The method according to claim 29, wherein processing the image comprises deriving the 3D map by finding respective offsets between the spots in areas of the captured image and corresponding reference spot locations belonging to a reference image of the pattern, wherein the respective offsets are indicative of respective distances between the areas and the image capture assembly.

46. The method according to claim 45, wherein capturing the image comprises applying a position-sensitive detector to sense and output an offset of each spot in the pattern on the object as the spot is projected by the illumination module.

47. The method according to claim 46, wherein applying the position-sensitive detector comprises scanning a field of view of the position-sensitive detector in synchronization with the scanner in the illumination module.

48. The method according to claim 46, wherein applying the position-sensitive detector comprises scanning a field of view of the position-sensitive detector together with the beam from the radiation source.

49. The method according to claim 45, wherein the offsets that are indicative of the respective distances occur in a first direction, and wherein capturing the image comprises imaging the pattern onto an array of detector elements arranged in one or more rows extending in the first direction using astigmatic optics having a greater optical power in the first direction than in a second, perpendicular direction.

50. The method according to claim 29, wherein capturing the image comprises scanning a sensing area or a sensor over the region of interest in synchronization with the scanned beam of the illumination module.

51. The method according to claim 50, wherein the sensor comprises an image sensor having a rolling shutter, and wherein scanning the sensing area comprises synchronizing the rolling shutter with the scanned beam.

52. The method according to claim 50, wherein scanning the beam comprises dynamically varying the selected angular range, and scanning the sensing area comprises dynamically scanning the sensing area to match the selected angular range of the scanned beam.

53. A method for mapping, comprising:

generating a beam of radiation having an intensity that varies according to a specified temporal modulation;

scanning the beam over a region of interest, so as to project the radiation onto the region with a spatial intensity pattern determined by the temporal modulation of the beam;

capturing an image of the spatial intensity pattern that is projected onto an object in the region of interest; and processing the image in order to construct a three-dimensional (3D) map of the object.

54. The method according to claim 53, wherein the temporal modulation is binary, and wherein the spatial intensity pattern comprises an array of spots generated by the temporal modulation.

55. The method according to claim 53, wherein processing the image comprises deriving the 3D map by finding respective offsets between the pattern in areas of the captured image and a reference image of the pattern, wherein the respective offsets are indicative of respective distances between the areas and the image capture assembly.

56. The method according to claim 53, wherein capturing the image comprises scanning a sensing area or a sensor over the region of interest in synchronization with the scanned beam.

* * * * *